(12) United States Patent
McCreary

(10) Patent No.: US 9,414,548 B1
(45) Date of Patent: Aug. 16, 2016

(54) STACKABLE SHEET FORMED CONTAINER, AND USE, FOR PLANT GROWTH, AND SHIPMENT

(71) Applicant: John C. McCreary, Altadena, CA (US)

(72) Inventor: John C. McCreary, Altadena, CA (US)

(*) Notice: Subject to any disclaimer, the term of this patent is extended or adjusted under 35 U.S.C. 154(b) by 0 days.

(21) Appl. No.: 13/986,818

(22) Filed: Jun. 10, 2013

(51) Int. Cl.
*A01G 9/02* (2006.01)

(52) U.S. Cl.
CPC .......................... *A01G 9/02* (2013.01)

(58) Field of Classification Search
CPC ......... A01G 1/007; A01G 9/02; A01G 9/026; A01G 9/028; A01G 9/1066; A01G 9/108; A01G 9/1423; A01G 9/1438; A01G 2009/1446; A01G 13/0212; A01G 27/006; A01G 27/02
USPC ............. 47/18, 19.1, 29.6, 29.7, 33, 65, 65.7, 47/65.9, 66.1, 66.5, 66.6, 79, 84, 87, 48.5
See application file for complete search history.

(56) References Cited

U.S. PATENT DOCUMENTS

| | | | | |
|---|---|---|---|---|
| 2,336,755 A | * | 12/1943 | Sejarto | 47/62 R |
| 3,606,004 A | * | 9/1971 | Fruehwirth | B65D 5/50 206/423 |
| 4,170,301 A | * | 10/1979 | Jones | B65D 85/52 206/423 |
| 4,209,092 A | * | 6/1980 | Jones | 206/423 |
| 5,076,010 A | * | 12/1991 | Rollins | 47/62 R |
| 5,217,117 A | * | 6/1993 | Tsuji | B65D 85/505 206/205 |
| 5,692,612 A | * | 12/1997 | Weder et al. | 206/423 |
| 5,852,896 A | * | 12/1998 | Flasch, Jr. | 47/79 |
| 6,016,628 A | * | 1/2000 | Schlosser | 47/65.8 |
| 6,401,389 B1 | * | 6/2002 | Mount et al. | 47/79 |
| 6,419,087 B1 | * | 7/2002 | Peters | 206/423 |
| 2003/0066238 A1 | * | 4/2003 | Whisenant | 47/79 |
| 2013/0036667 A1 | * | 2/2013 | Beck | 47/66.7 |
| 2015/0059244 A1 | * | 3/2015 | Hashimoto et al. | 47/79 |

FOREIGN PATENT DOCUMENTS

DE 4419402 C1 * 10/1995 ............. A01G 9/02
FR EP 0786202 A1 * 1/1997

OTHER PUBLICATIONS

English-language translation of EP 0786202 A1.*

* cited by examiner

*Primary Examiner* — Lisa Tsang
(74) *Attorney, Agent, or Firm* — William W. Haefliger

(57) ABSTRACT

Vegetation growth apparatus, comprising substantially planar, insulative plastic sheeting formed into a stackable box shape container having side walls, the container having an interior sized to contain receptacles containing initial growth vegetation, certain of the walls having slits sized to permit roots of certain vegetation to be pushed through the slits after removal from the receptacles, and into potting material introduced into the container interior.

14 Claims, 6 Drawing Sheets

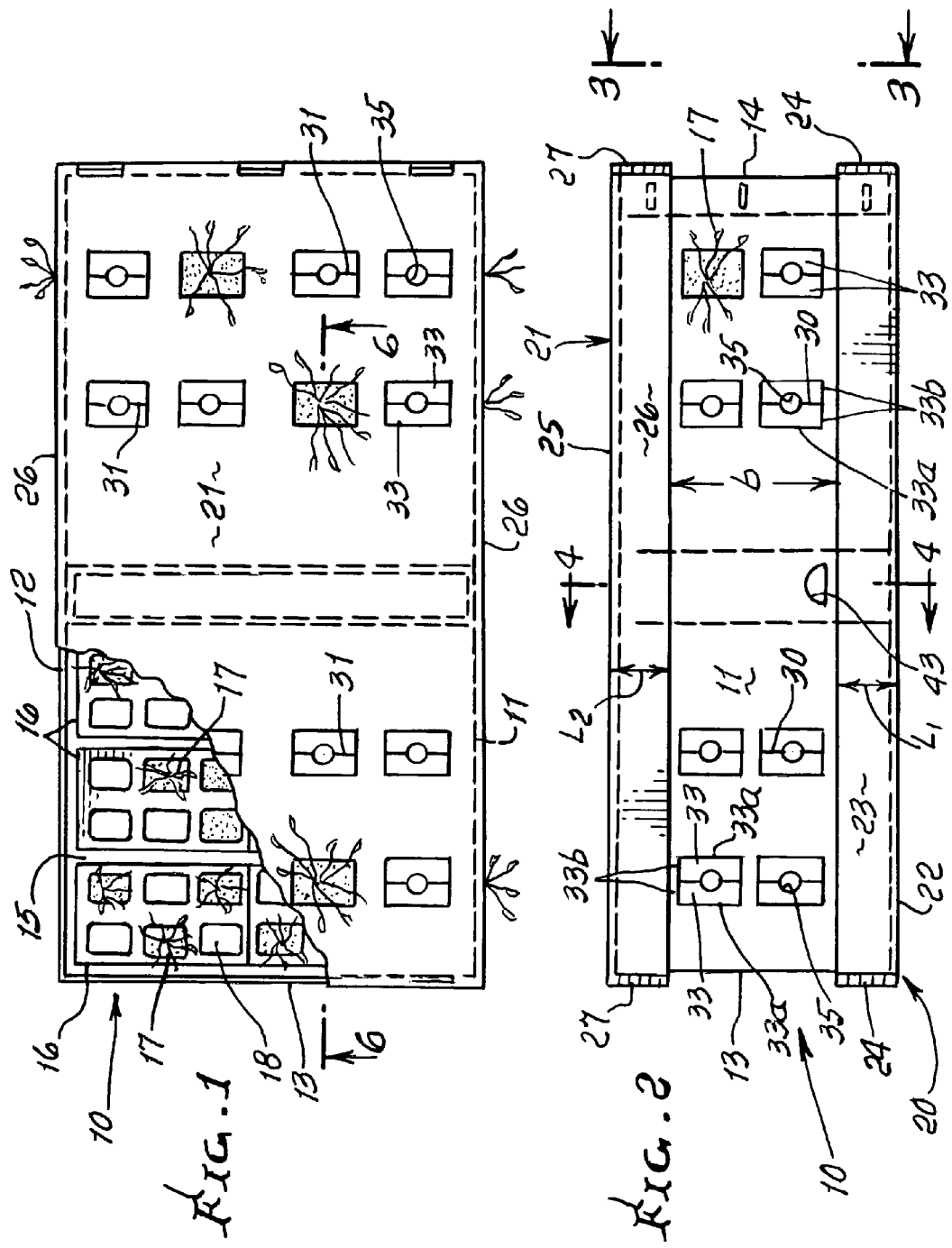

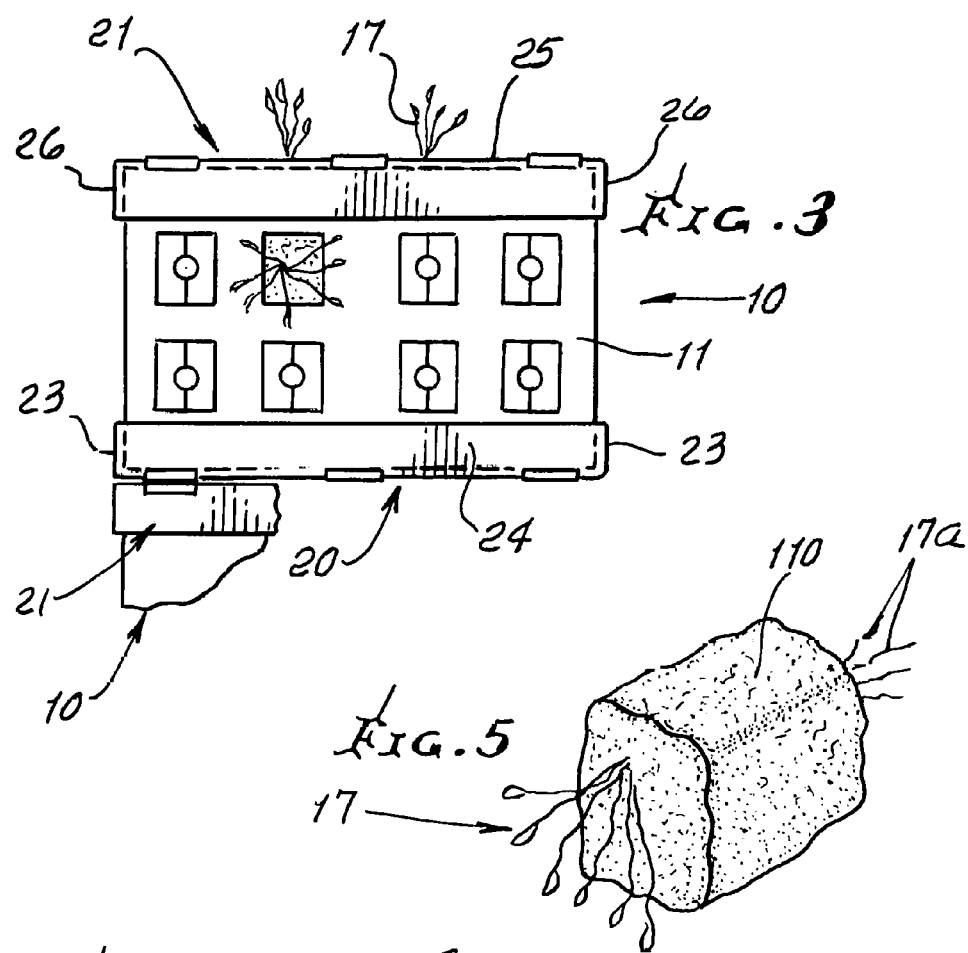
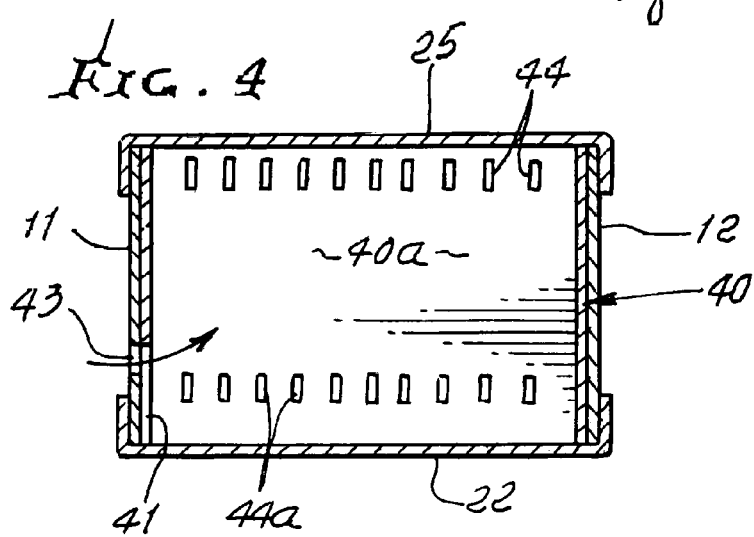

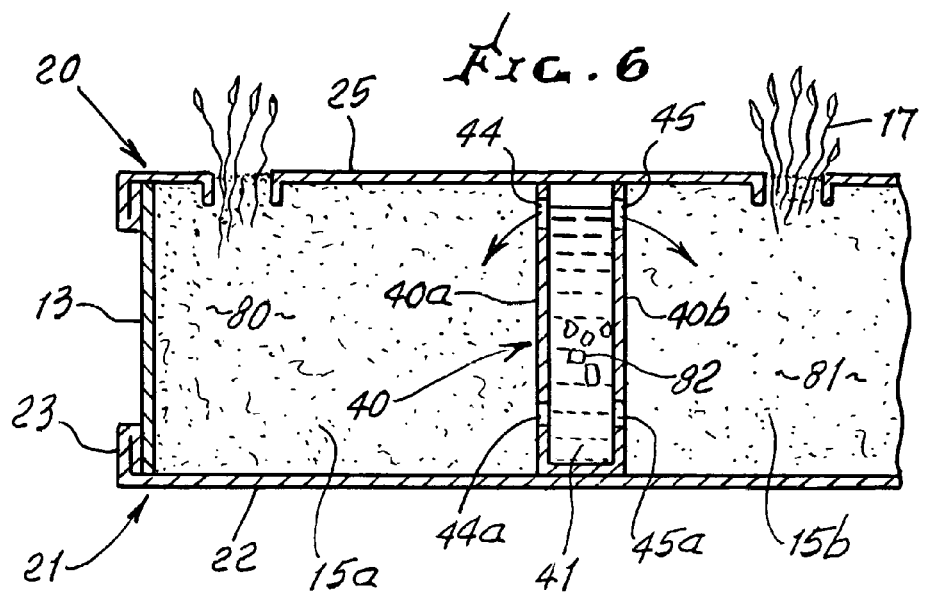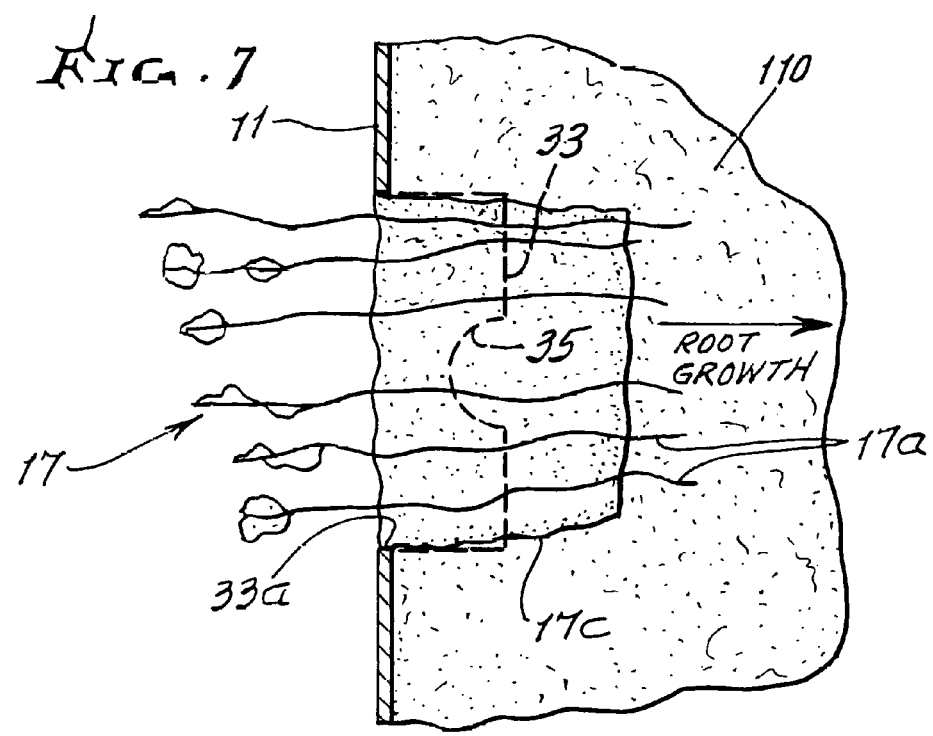

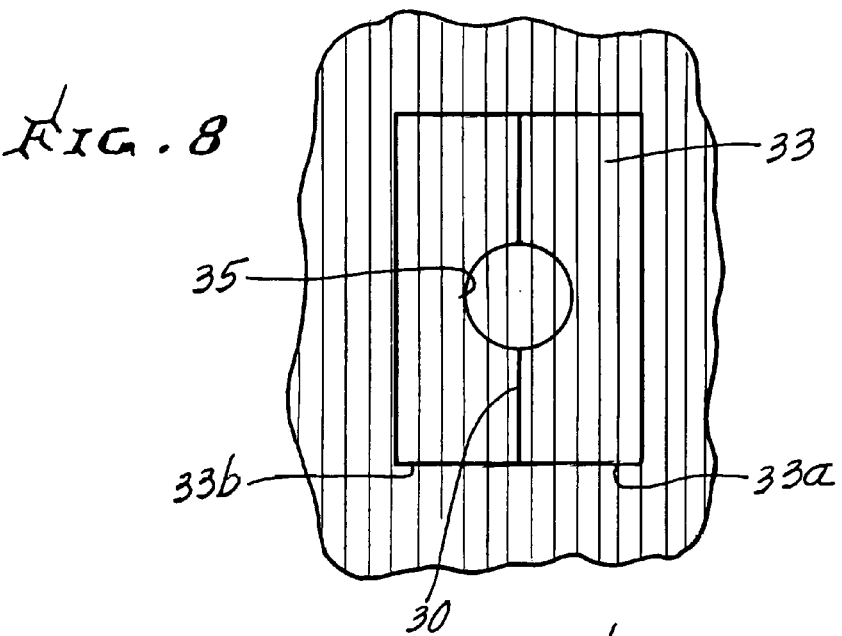
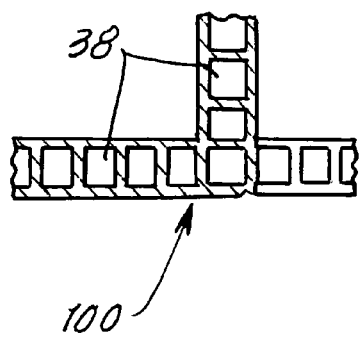
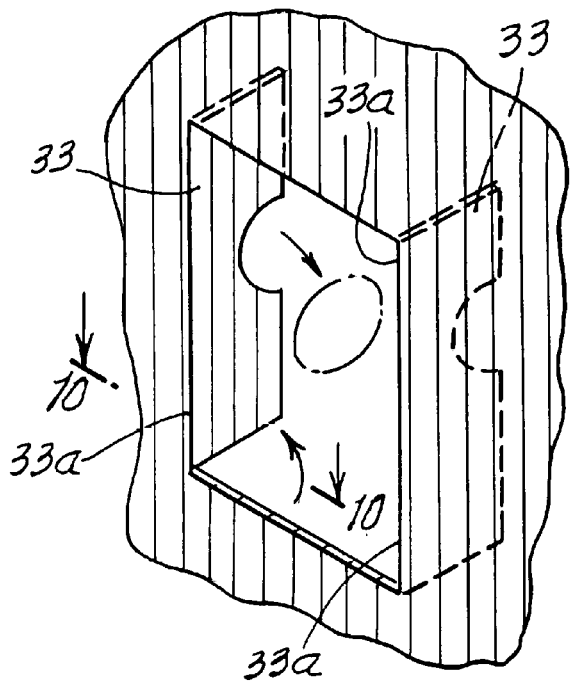

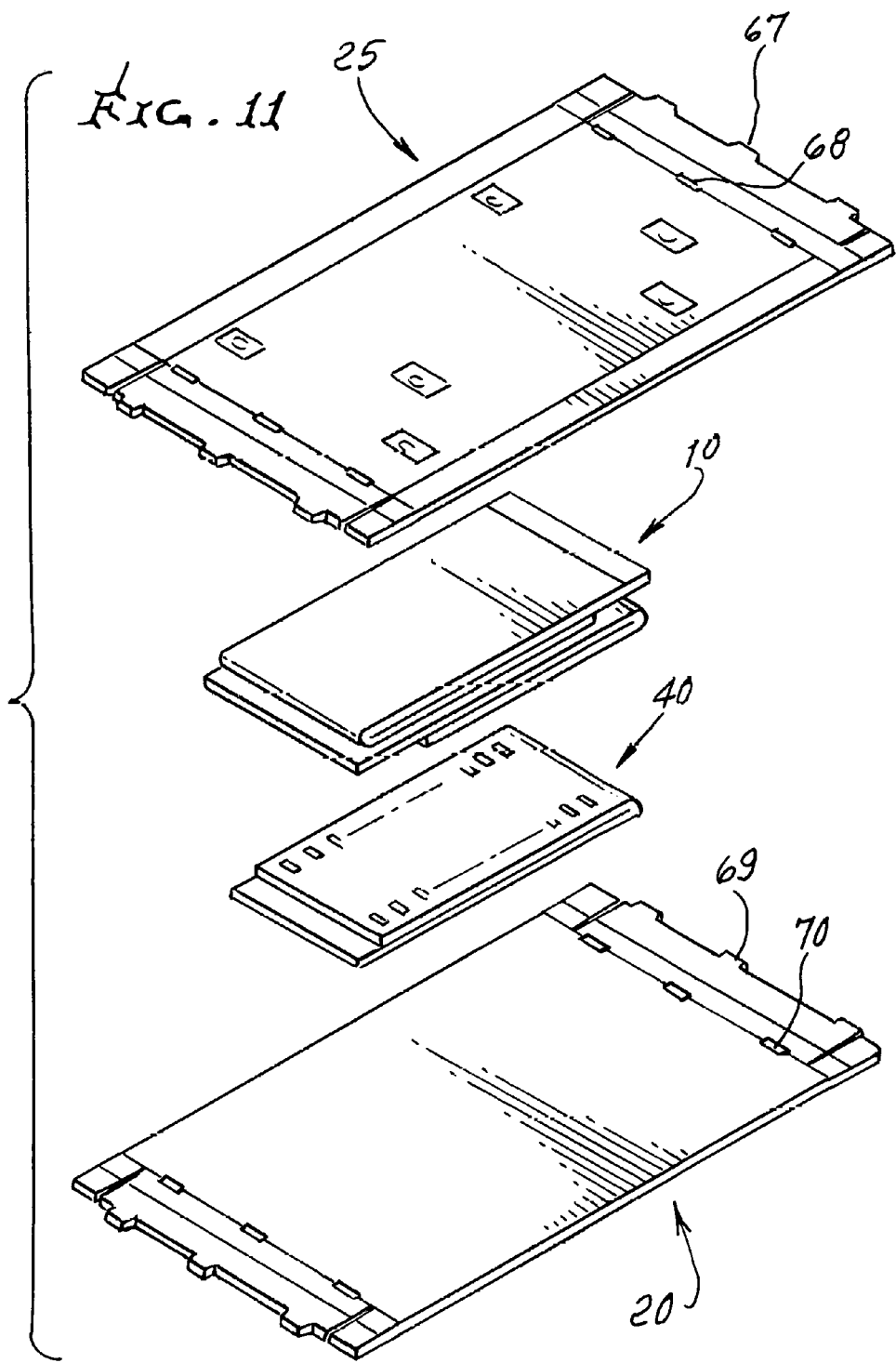

STACKABLE SHEET FORMED CONTAINER, AND USE, FOR PLANT GROWTH, AND SHIPMENT

BACKGROUND OF THE INVENTION

This invention relates generally to apparatus that can be easily assembled for efficiently locating and establishing plant growth both inside and outside assembled containers; and more particularly it concerns apparatus and methods enabling users to quickly assemble unique apparatus from plastic sheets to establish environment for vegetation growth initially inside and later supported outside and adjacent the assembled containers.

There is need for more efficient and easily rapidly assembled components of plant growth systems, as well as methods of use of such systems. Also, there is need for provision and assembly of foldable sheet components of system that enable vegetation growth initially within containers as referred to, for warmth and initial irrigation, and subsequently outside and upon the walls and tops of such containers, for vegetation expansion and display, as disclosed herein.

SUMMARY OF DESCRIPTION

It is a major object of the invention to provide improved apparatus to promote vegetation growth in two phases, that comprises:

a) substantially planar, insulative plastic sheeting rapidly formable into a moisture retaining box shaped container having side walls, and which is suitable for shipment and may be stackable.

b) the formed container having an interior sized to contain receptacles containing initial growth vegetation, to promote and protect initial growth, c) certain of such walls having slits located and sized to permit roots of certain of the vegetation to be externally pushed through the slits after removal from said receptacles, and into potting material introduced into the container interior, for subsequent growth.

Such apparatus may include a container lid folded to seat on the container sheet-like walls, the lid having slits sized to pass roots of other of said vegetation downwardly into the container interior.

Another object includes provision of certain upright side walls which are translucent or transparent, to pass sunlight facilitating vegetation growth.

A further object is to provide sheet-like container walls that contain elongated parallel cells, the side walls forming hinge loci for wall flaps adjacent the slits, which are parallel to the cells. Folding of the flaps to pass plant roots for subsequent growth is thereby facilitated. Vegetation roots typically form bundles which are inserted through wall openings formed by flap folding; and two such flaps may form one opening whereby such flaps are easily partially foldable along hinge lines parallel to the wall cells, with lower flaps then extended to support root structure.

An added object is to provide divider sheeting received in the container interior between two thereby formed container interior sections, the divider also forming an irrigation flow passage accessing the two sections, and such that ice or jelled water may be received in that passage. Such a divider may be inserted and adjustably located at a selected interior portion of the container, and frictionally held in position by opposite side walls in any selected insertion position. As will be seen, the walls and divider, as well as the lid, may consist of water-proof plastic material, such as extruded polypropylene, containing parallel elongated cells, as referred to.

An important object, facilitating functionality and ease of assembly by the user, is to provide the container, divider, lid and tray to initially have co-planar sheet configuration avoiding bulkiness, to be folded along fold lines pre-formed in the sheet, into ultimate container, divider and tray interfitting and mutually supporting configuration. The element configurations are such as to enable ease of local folding of the co-planar sheets, and then with press together assembly, to form the upright container walls seated at the tray, the folded divider then inserted downwardly into the container interior and located to enable water distribution to vegetation in sub-trays inserted within the container interior, the lid ultimately placed on the walls helping to hold them in position. Subsequently, the partially grown vegetation is removed from the sub-containers, and roots externally inserted through the walls, into potting soil or other growth promoting material introduced into the container interior system, as will be described.

Further objects include provision of stackable containers; and provision of ice in containers for irrigation of potting soil.

These and other objects and advantages of the invention, as well as the details of an illustrative embodiment, will be more fully understood from the following specification and drawings, in which:

DRAWING DESCRIPTION

FIG. 1 is a top plan view of vegetation growth apparatus incorporating the invention;

FIG. 2 is a side elevation view of the FIG. 1 apparatus;

FIG. 3 is an end view taken on lines 3-3 of FIG. 1;

FIG. 4 is a section taken on lines 4-4 of FIG. 2;

FIG. 5 is a perspective view of a preliminary growth bundle, including soil, roots and growth, as retrieved from a multiple bundle sub-pack;

FIG. 6 is a section taken on lines 6-6 of FIG. 1, showing growth through openings in box lid;

FIG. 7 is an enlarged elevation showing growth bundle insertion through side wall of box;

FIG. 8 is a side view of a box wall, with wall cell configuration, and extended to side wall flaps defining a wall opening;

FIG. 9 is a perspective view of FIG. 8 configuration, after side wall flaps have been folded inwardly into full opening positions;

FIG. 10 is an enlarged fragmentary section taken on lines 10-10 of FIG. 9;

FIG. 11 is an exploded view of flat panels or sheets that collectively form initial configurations of box bottom and two end walls; box side walls; box divider and box top; all in unfolded condition;

DETAILED DESCRIPTION

Figure 12:
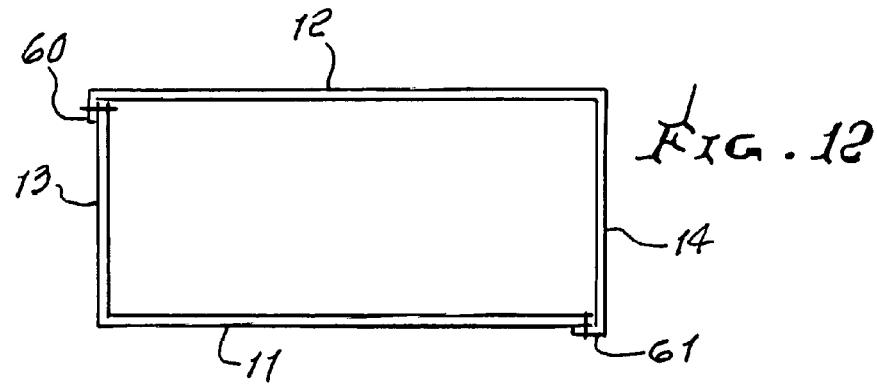
FIGS. 12-14 are views showing panel folding steps.

Referring to FIGS. 1-4, the basic vegetation growth apparatus comprises: substantially planar, insulative, sheeting formed into a box shaped container 10 having upright side walls 11 and 12, and upright end walls 13 and 14, the container having an interior 15 sized to contain multiple initial growth receptacles 16 that contain initial growth vegetation 17. Pockets 18 in receptacles 16 are sized to contain vegetation 17 roots 17a and potting soil 19. The box includes a horizontal tray 20 that supports receptacles 16 and the box walls 11-14, and a lid 21 overlying the interior 15, the lid and tray also typically comprising planar, insulative sheeting. Tray 20 has a bottom horizontal panel 22, and side walls 23 and end walls 24 of reduced height "$L_1$". Lid 21 has a top horizontal panel 25, and side walls 26 and end walls 27 of reduced height "$L_2$", as shown in FIG. 2. There is vertical spacing "b" between tray and lid walls 23 and 24, and walls 26 and 27, sufficient to expose the side walls and end walls 11-14, certain of which have vertical slits 30 sized to permit roots of certain of the vegetation 17 to be pushed through the slits after vegetation removal from the receptacle 16, and into potting material 110 introduced downwardly into the container 10. Lid 21 may be upwardly removed to gain access to receptacles 16 and vegetation 17 in those receptacles, and also to enable downward introduction of potting soil into the container interior. In this regard, the lid 21 itself may have slits 31, like slits 30, to permit roots of other of the vegetation 17 to be pushed downwardly through said slits 31, and into potting soil in the container. When such soil is well irrigated, lid 21 is upwardly removable to separate vegetation carried by the lid from vegetation carried by box side walls.

The vertically extending slits 30 have associated wall flaps 33 adjacent the slits, the flaps having hinges or hinge loci 33a that extend vertically allowing root bundle push-in as referred to. Also, pre-formed circular through openings 35 in the side walls, intersected by the slits 30, delineate and facilitate root bundle insertion. The flaps also have pre-cut horizontal slits 33b extending between slits 30 and the hinge loci 33a, and spaced from openings 35, as shown. Preferably, the container side and end walls or panels contain elongated parallel cells 38 that aid in stiffening of the plastic side walls, as shown in FIGS. 8-10. The hinge loci 33a extend parallel to such cells, to enable fold-back of the two flaps in response to root bundle insertion force exerted against the flaps. See FIG. 7 showing a flap 33 in folded-back or inward position, adjacent root bundle 17c. See also FIGS. 8 and 10. The plastic material of the sheeting 100 is preferably polypropylene. At least a portion of the lid and/or side and end walls may consist of translucent or transparent material (for example plastic), to allow sunlight to penetrate into the box interior, to promote initial growth of the vegetation in the receptacles 16.

Also provided is a divider 40 consisting of sheeting received or placed into the container interior between two container interior sections 15a and 15b, shown in FIGS. 1 and 6. The divider is typically formed from the same cellular sheet material as the side and end walls of the container, and it is configured to form an irrigation flow passage 41, between dividing two upright parallel panels 40a and 40b. Water is received in trough or passage 41, as via a lower side opening 43 in side wall 11, and it rises and flows through upper outlet openings 44 and 45 in panels 40a and 40b, into the potting soil 80 and 81 in the interior sections 15a and 15b.

Ice pieces, indicated at 82 may be introduced into trough 41 to slowly melt and discharge cold water via openings 44 and 45, or lower openings 44a and 45a, into the potting soil 80 and 81, and to refrigerate such soil and any plant roots or vegetation 17, facilitating shipment of the container with presentation of applied or inserted vegetation. Resilient lining of the flaps 33 urges them toward closed position to aid in water retention in the potting soil, and such soil in sections 15a and 15b.

Figure 13:
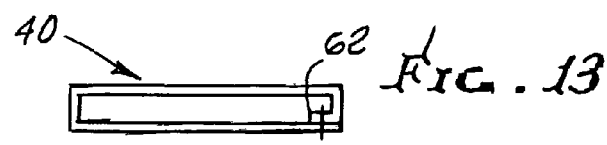
Figure 14:
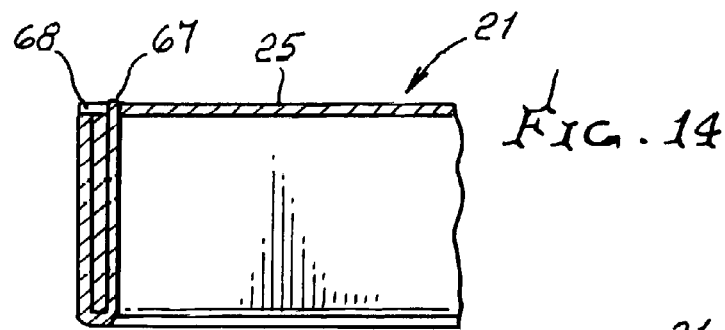
Figure 15:
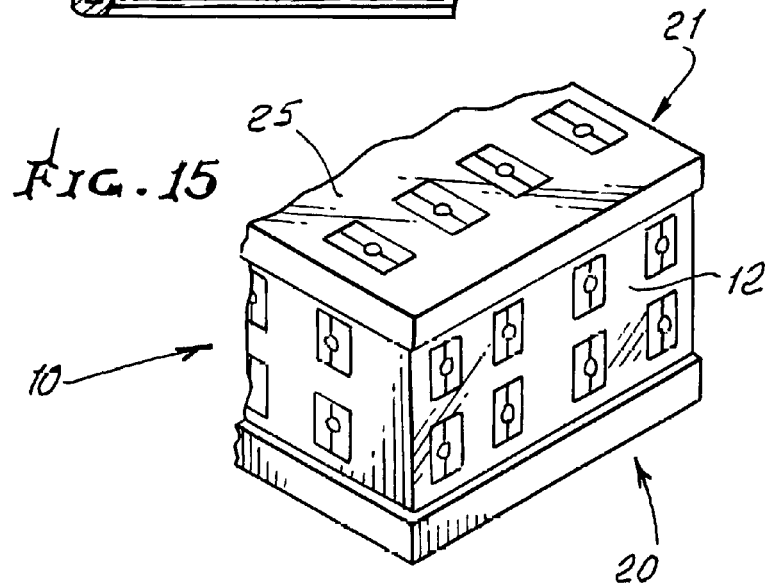
FIG. 15 is a fragmentary perspective view showing a corner appearance of the assembled components.

FIG. 11 shows the initial sheet form elements of the apparatus, to be folded to form the container side and end walls, the tray side and end walls, and the lid side and end walls. FIGS. 12-14 show typical folds 60-62 in folding of such walls and the divider and fold retainers. FIG. 15 shows slits and flaps formed in container side and end walls, and in the lid, with flaps closed to retain box contents, including potting soil in the box. Tabs 67 fit retention openings 68 as in lid 21 in FIG. 11. Also, tabs 69 and openings 70, are shown for the tray 20 in FIG. 11. FIG. 3 shows stacking of containers, with tray 20 of an upper container seated on lid 21 of a lower container.

As seen in FIG. 1, the rectangular plastic receptacles 16 may be stored in the container 10 interior, for shipment. The wall flaps 33 are closed, during shipment (by resilient hinge action) to protect the receptacles and vegetation.

What is claimed is:

1. A vegetation growth apparatus, comprising
   a) substantially planar, insulative plastic sheeting formed into a stackable box shape container having only four side walls,
   b) said container having an interior sized to contain receptacles containing initial growth vegetation,
   c) certain of said walls having slits sized to permit roots of certain of said vegetation to be pushed through the slits, and into potting material introduced into said container interior, and enabling vegetation growth alongside the container whereby the container remains stackable,
   d) there being divider sheeting received in the container interior between two container interior sections, the divider sheeting forming an irrigation flow passage between said two sections via upper outlets in the divider sheeting, and a sheeting tray underlying said side walls, divider sheeting and interiors of said sections, there being a lid everywhere spaced from said tray, certain of said side wall slits exposed to the container exterior, between the tray and lid,
   e) the container divider sheeting and the tray consist of the same plastic material forming insulative, elongated cells,
   f) and wherein the tray has side and end walls and a a tray bottom wall, and the entire divider sheeting, tray, and tray side and end walls initially all having everywhere co-planar, parallel, sheet configuration, and subsequently having folding along pre-formed fold lines into ultimate container, divider and tray configurations, wherein all of the tray and container side and end walls are folded upwardly to extend vertically away from said tray bottom wall into a rectangular tray configuration underlying said side and end walls,
   g) said side walls containing elongated parallel cells, the side walls forming hinges for wall flaps adjacent said slits, which are parallel to said cells.

2. The apparatus of claim 1 wherein said lid is seated on said walls, said lid having slits sized to pass roots of other of said vegetation downwardly into the container interior.

3. The apparatus of claim 1 wherein certain of said side walls are translucent or transparent, to pass sunlight.

4. The apparatus of claim 1 wherein said hinges are at locations which are parallel to said elongated cells.

5. The apparatus of claim 4 including said vegetation roots forming bundles which are inserted through said side wall openings, each of said openings formed by only two of said flaps, said flaps each having hinged connection to one of said container sidewalls.

6. The apparatus of claim 5 including multiple said receptacles stored in the container, the wall flaps closed to protect said stored receptacles.

7. The apparatus of claim 1 wherein said sheeting consists of polypropylene.

8. The apparatus of claim 7 wherein said side walls have the divider sheeting, which consists of polypropylene.

9. The apparatus of claim 1 wherein all of said container side walls have pre-formed fold lines conforming to an initial co-planar configuration to be folded into the container, divider sheeting and tray configurations.

10. The apparatus of claim 1, wherein said lid is seated on said walls, said lid having slits sized to pass roots of other of said vegetation downwardly into the container interior.

11. The apparatus of claim 1 including ice in said flow passage.

12. The apparatus of claim 1 including ice in said flow passage, said ice melting to supply ice water to said sections.

13. The apparatus of claim 1 wherein said hinges are resilient to urge the flaps toward closed positions relative to said side walls.

14. The apparatus of claim 1 wherein said divider sheeting is received in the container interior, the divider sheeting forming the irrigation flow passage, and including ice provided in said flow passage.

\* \* \* \* \*